(12) United States Patent
Hwang et al.

(10) Patent No.: US 10,400,864 B2
(45) Date of Patent: Sep. 3, 2019

(54) MULTISTAGE TRANSMISSION FOR VEHICLE

(71) Applicants: HYUNDAI MOTOR COMPANY, Seoul (KR); KIA MOTORS CORPORATION, Seoul (KR)

(72) Inventors: Seong Wook Hwang, Gunpo-si (KR); Hyun Sik Kwon, Seoul (KR); Ki Tae Kim, Incheon (KR); Won Min Cho, Hwaseong-si (KR); Jae Chang Kook, Hwaseong-si (KR); Seong Wook Ji, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 96 days.

(21) Appl. No.: 15/835,652

(22) Filed: Dec. 8, 2017

(65) Prior Publication Data

US 2019/0048977 A1 Feb. 14, 2019

(30) Foreign Application Priority Data

Aug. 11, 2017 (KR) .......................... 10-2017-0101997

(51) Int. Cl.
*F16H 3/66* (2006.01)

(52) U.S. Cl.
CPC ........ *F16H 3/66* (2013.01); *F16H 2200/0069* (2013.01); *F16H 2200/2012* (2013.01); *F16H 2200/2046* (2013.01); *F16H 2200/2097* (2013.01)

(58) Field of Classification Search
CPC .............. F16H 3/66; F16H 2200/2012; F16H 2200/2046; F16H 2200/0069
USPC .......................................... 475/275–292, 330
See application file for complete search history.

(56) References Cited

U.S. PATENT DOCUMENTS

| 9,587,714 | B2 | 3/2017 | Kook et al. |
| 9,810,292 | B2* | 11/2017 | Kwon ........................ F16H 3/66 |
| 2019/0024758 | A1* | 1/2019 | Hwang ................... F16H 3/666 |
| 2019/0024760 | A1* | 1/2019 | Hwang ................... F16H 3/666 |

* cited by examiner

*Primary Examiner* — Roger L Pang
(74) *Attorney, Agent, or Firm* — Brinks Gilson & Lione

(57) ABSTRACT

A multistage transmission for a vehicle includes: input and output shafts; four planetary gear devices each having three rotary elements to transfer rotary force; and six shift elements connected to the rotary elements of the planetary gear devices. A first rotary element of the first planetary gear device is selectively connected to a transmission case and to a second rotary element of a second planetary gear device, a second rotary element of the first planetary gear device is selectively connected to the transmission case and fixedly connected to a third rotary element of the second planetary gear device, and a third rotary element of the first planetary gear device is selectively connected to the second rotary element of the second planetary gear device and fixedly connected to a third rotary element of a third planetary gear device and a first rotary element of a fourth planetary gear device.

6 Claims, 3 Drawing Sheets

FIG. 2

|      | B1 | B2 | C1 | C2 | C3 | C4 |
|------|----|----|----|----|----|----|
| 1ST  |    | ●  | ●  |    | ●  |    |
| 2ND  | ●  | ●  |    |    | ●  |    |
| 3RD  |    | ●  |    | ●  | ●  |    |
| 4TH  | ●  |    |    | ●  | ●  |    |
| 5TH  |    |    |    | ●  | ●  | ●  |
| 6TH  | ●  |    |    | ●  |    | ●  |
| 7TH  |    | ●  |    | ●  |    | ●  |
| 8TH  | ●  | ●  |    |    |    | ●  |
| 9TH  |    | ●  | ●  |    |    | ●  |
| 10TH | ●  |    | ●  |    |    | ●  |
| REV  | ●  |    | ●  |    | ●  |    |

US 10,400,864 B2

MULTISTAGE TRANSMISSION FOR VEHICLE

CROSS REFERENCE TO RELATED APPLICATION

The present application claims priority to Korean Patent Application No. 10-2017-0101997, filed on Aug. 11, 2017, which is incorporated herein by reference in its entirety.

FIELD

The present disclosure relates generally to a multistage transmission for a vehicle.

BACKGROUND

The statements in this section merely provide background information related to the present disclosure and may not constitute prior art.

Recent increases in oil prices lead vehicle companies into more competition to improve fuel efficiency of vehicles. Especially in regards to the engine of a vehicle, research has focused on weight reduction through downsizing and improvement in fuel efficiency.

As an approach to improving fuel efficiency in regard to a vehicle transmission, there is a method of increasing the number of gears, which aims at operation of an engine at a desired operation point, ultimately leading to improvement in fuel efficiency.

A multistage transmission also enables an engine to operate at slow speed, i.e., at a relatively low RPM (revolutions per minute) range, so as to improve noise and vibration characteristics of a vehicle.

However, as the number of gears increases, the number of parts constituting the transmission correspondingly increases. This deteriorates mountability and overall transmission efficiency and also increases raw material costs and weight of the transmission. Therefore, we have discovered that in order to improve fuel efficiency through increasing the number of gears of a transmission, it is a key to devise a multistage transmission with reduced number of parts and having a simple structure.

The foregoing is intended merely to aid in the understanding of the background of the present disclosure, and is not intended to mean that the present disclosure falls within the purview of the related art that is already known to those skilled in the art.

SUMMARY

The present disclosure provides a multistage transmission for a vehicle, the transmission providing at least ten forward stages and one reverse stage or more with a relatively small number of parts and a relatively simple structure, whereby the transmission enables an engine to silently operate at a desired operation point, thereby increasing fuel efficiency and achieving silent driving of a vehicle.

In one form of the present disclosure, a multistage transmission for a vehicle may include: an input shaft and an output shaft; a first planetary gear device, a second planetary gear device, a third planetary gear device, and a fourth planetary gear device, which are arranged to transfer rotary force between the input shaft and the output shaft, each of the first, second, third and fourth planetary gear devices including first, second and third rotary elements; and six shift elements connected to the rotary elements of the first to fourth planetary gear devices. In particular, the second rotary element of the first planetary gear device is fixedly connected to the third rotary element of the second planetary gear device, and the third rotary element of the first planetary gear device is fixedly connected to the third rotary element of the third planetary gear device and to the first rotary element of the fourth planetary gear device. The first rotary element of the second planetary gear device is fixedly connected to the input shaft and is fixedly connected to the second rotary element of the fourth planetary gear device, and the first rotary element of the third planetary gear device is fixedly connected to the second rotary element of the fourth planetary gear device.

The first rotary element of the first planetary gear device may be selectively connected to a transmission case and to the second rotary element of the second planetary gear device, the second rotary element of the first planetary gear device may be selectively connected to the transmission case, the third rotary element of the first planetary gear device may be selectively connected to the second rotary element of the second planetary gear device, the second rotary element of the third planetary gear device may be selectively connected to the output shaft, and the third rotary element of the fourth planetary gear device may be selectively connected to the output shaft.

The first rotary element of the first planetary gear device may be selectively connected to the transmission case via a first brake of the six shift elements, and the second rotary element of the first planetary gear device may be selectively connected to the transmission case via a second brake of the six shift elements.

The first rotary element of the first planetary gear device and the second rotary element of the second planetary gear device may be selectively connected to each other via a first clutch of the six shift elements, the third rotary element of the first planetary gear device and the second rotary element of the second planetary gear device may be selectively connected to each other via a second clutch of the six shift elements, the second rotary element of the third planetary gear device and the output shaft may be selectively connected to each other via a third clutch of the six shift elements, and the third rotary element of the fourth planetary gear device and the output shaft may be selectively connected to each other via a fourth clutch of the six shift elements.

In another form, a multistage transmission for a vehicle includes: a first planetary gear device, a second planetary gear device, a third planetary gear device, and a fourth planetary gear device each of which comprises first, second and third rotary elements; six shift elements configured to provide variable frictional force; and eight rotary shafts connected to the rotary elements of the first, second, third, and fourth planetary gear devices and respectively referred to as first, second, third, fourth, fifth, sixth, seventh, and eighth rotational shafts. In particular, the first rotational shaft is an input shaft fixedly connected to the first rotary element of the second planetary gear device, the first rotary element of the third planetary gear device, and the second rotary element of the fourth planetary gear device; the second rotational shaft is fixedly connected to the second rotary element of the second planetary gear device; the third rotational shaft is fixedly connected to the first rotary element of the first planetary gear device; the fourth rotational shaft is fixedly connected to the second rotary element of the first planetary gear device and the third rotary element of the second planetary gear device; the fifth rotational shaft is fixedly connected to the third rotary element of the first planetary gear device, the third rotary element of the third planetary gear device, and the first rotary element of the fourth planetary gear device; the sixth rotational shaft is fixedly connected to the second rotary element of the third planetary gear device; the seventh rotational shaft is fixedly connected to the third rotary element of the fourth planetary gear device; and the eighth rotational shaft is an output shaft.

The six shift elements may include: a first brake installed between the third rotational shaft and the transmission case; a second brake installed between the fourth rotational shaft and the transmission case; a first clutch installed between the second rotational shaft and the third rotational shaft; a second clutch installed between the second rotational shaft and the fifth rotational shaft; a third clutch installed between the sixth rotational shaft and the eighth rotational shaft; a fourth clutch installed between the seventh rotational shaft and the eighth rotational shaft.

As described above, a multistage transmission according to the present disclosure can provide at least ten forward stages and one reverse stage or more with a simplified structure and a reduced weight, thereby improving fuel efficiency of a vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operation mode table showing gears that can be provided by the transmission of FIG. 1.

Figure 1:
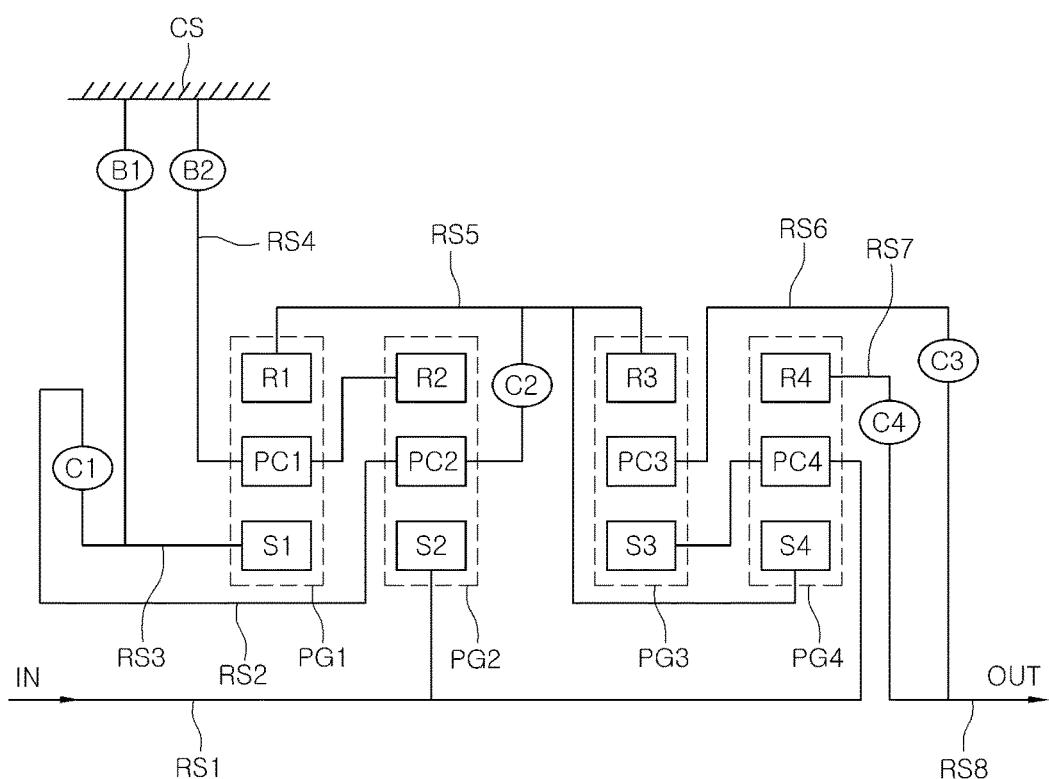
FIG. 1 is a block diagram illustrating the construction of a multistage transmission for a vehicle in one form of the present disclosure.
Figure 3:
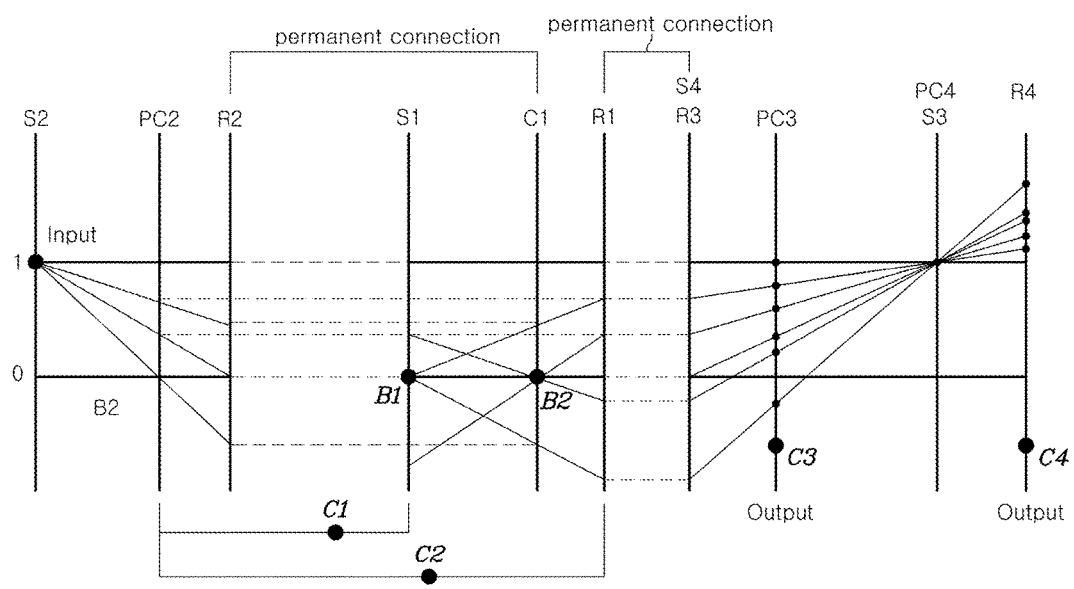
FIG. 3 is a lever line diagram illustrating gears provided by the transmission of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Here, the term "fixedly connected" or the like means at least two members are connected to each other to always rotate together. Therefore, it is to be understood by a person of an ordinary skill in the art that the term "fixedly connected" or the like differs from the term "operably connected" or the like.

Here, the term "selectively connected" or the like means at least two members (e.g. a plurality of shafts including the input shaft and the output shaft, or plurality of rotary elements) that are connectable and disconnectable to/from each other, e.g. through at least one intermediate member or a shift element, and when connected rotate with the same rotational speed, or are connectable to the transmission housing through at least one intermediate member to be fixed to the transmission housing.

With reference to FIG. 1, according to one form of the present disclosure, a multistage transmission for a vehicle, includes: an input shaft IN and an output shaft OUT; a first planetary gear device PG1, a second planetary gear device PG2, a third planetary gear device PG3, and a fourth planetary gear device PG4 that are arranged to transfer rotary force between the input shaft IN and the output shaft OUT and each of which includes three rotary elements of the first to fourth planetary gear devices PG1 to PG4.

A first rotary element S1 of the first planetary gear device PG1 can be selectively connected to a transmission case CS via one of the shift elements and is selectively connected to a second rotary element PC2 of the second planetary gear device PG2. A second rotary element PC1 of the first planetary gear device PG1 can be selectively connected to the transmission case CS via another one of the shift elements and is fixedly connected to a third rotary element R2 of the second planetary gear device PG2. A third rotary element R1 of the first planetary gear device PG1 is selectively connected to the second rotary element PC2 of the second planetary gear device PG2 and is fixedly connected to a third rotary element R3 of the third planetary gear device PG3 and a first rotary element S4 of the fourth planetary gear device PG4.

A first rotary element S2 of the second planetary gear device PG2 is directly connected to the input shaft IN and is fixedly connected to a second rotary element PC4 of the fourth planetary gear device PG4. A first rotary element R3 of the third planetary gear device PG3 is fixedly connected to a second rotary element PC4 of the fourth planetary gear device PG4, and a second rotary element PC3 of the third planetary gear device PG3 is selectively connected to the output shaft OUT. A third rotary element R4 of the fourth planetary gear device PG4 is selectively connected to the output shaft OUT.

The first planetary gear device PG1, the second planetary gear device PG2, the third planetary gear device PG3, and the fourth planetary gear device PG4 are arranged in this consecutive order, when viewed axially, from the input shaft IN to the output shaft OUT.

Specifically, the first rotary element 51 of the first planetary gear device PG1 can be selectively connected to the transmission case CS via a first brake B1 of the shift elements, and the second rotary element PC1 of the first planetary gear device PG1 can be selectively connected to the transmission case CS via a second brake B2 of the shift elements.

That is, the first rotary element 51 and the second rotary element PC1 of the first planetary gear device PG1 are selectively connected to the transmission case CS by the first brake B1 and the second brake B2, respectively, or are rendered freely rotatable.

The first rotary element 51 of the first planetary gear device PG1 and the second rotary element PC2 of the second planetary gear device PG2 are selectively connected to each other via a first clutch C1 of the shift elements. The third rotary element R1 of the first planetary gear device PG1 and the second rotary element PC2 of the second planetary gear device PG2 are selectively connected to each other via a second clutch C2 of the shift elements. The second rotary element PC3 of the third planetary gear device PG3 and the output shaft OUT are selectively connected to each other via a third clutch C3 of the shift elements. The third rotary element R4 of the fourth planetary gear device PG4 and the output shaft OUT are selectively connected to each other via a fourth clutch C4 of the shift elements.

The first brake B1, the second brake B2, the first clutch C1, the second clutch C2, the third clutch C3, and the fourth clutch C4 are all controlled by a controller. Those elements are controlled in accordance with drive conditions of a vehicle on the basis of an operation mode table of FIG. 2. The multistage transmission of the present disclosure can form a total of at least forward ten stages and reverse one stage or more.

The first brake B1, the second brake B2, the first clutch C1, the second clutch C2, the third clutch C3, the fourth clutch C4 are collectively referred to as 'shift elements'. When the transmission of the present disclosure performs a series of gear shifts from a first gear to a tenth gear as illustrated in FIG. 2, the transmission has a clutch-to-clutch shifting structure in which one shift element is disengaged and another shift element is engaged.

The first rotary element, the second rotary element, and the third rotary element of the first planetary gear device PG1 are respectively implemented by a first sun gear S1, a first carrier PC1, and a first ring gear R1. The first rotary element, the second rotary element, and the third rotary element of the second planetary gear device PG2 are respectively implemented by a second sun gear S2, a second carrier PC2, and a second ring gear R2. The first rotary element, the second rotary element, and the third rotary element of the third planetary gear device PG3 are respectively implemented by a third sun gear S3, a third carrier PC3, and a third ring gear. The first rotary element, the second rotary element, and the third rotary element of the fourth planetary gear device PG4 are respectively implemented by a fourth sun gear S4, a fourth carrier PC4, and a fourth ring gear R4.

The multistage transmission structured as described above can be also expressed as a multistage transmission including: a first planetary gear device PG1, a second planetary gear device PG2, a third planetary gear device PG3, and a fourth planetary gear device PG4 each including three rotary elements; six shift elements providing variable frictional force; and eight rotational shafts respectively referred to as first to eighth rotational shafts and connected to the rotary elements of the first to fourth planetary gear devices PG1 to PG4.

The first rotational shaft RS1 is an input shaft IN fixedly connected to a first rotary element S2 of the second planetary gear device PG2, a first rotary element S3 of the third planetary gear device PG3, and a second rotary element PC4 of the fourth planetary gear device PG4. The second rotational shaft RS2 is fixedly connected to a second rotary element PC2 of the second planetary gear device PG2. The third rotational shaft RS3 is fixedly connected to a first rotary element S1 of the first planetary gear device PG1. The fourth rotational shaft RS4 is fixedly connected to a second rotary element PC1 of the first planetary gear device PG1 and a third rotary element R2 of the second planetary gear device PG2. The fifth rotational shaft RS5 is fixedly connected to a third rotary element R1 of the first planetary gear device PG1, a third rotary element R3 of the third planetary gear device PG3, and a first rotary element S4 of the fourth planetary gear device PG4. The sixth rotational shaft RS6 is fixedly connected to a second rotary element PC3 of the third planetary gear device PG3. The seventh rotational shaft RS7 is fixedly connected to a third rotary element R4 of the fourth planetary gear device PG4. The eighth rotational shat RS8 is an output shaft OUT.

Among the six shift elements, a first brake B1 is installed between the third rotational shaft RS3 and a transmission case CS, a second brake B2 is installed between the fourth rotational shaft RS4 and the transmission case CS, a first clutch C1 is installed between the second rotational shaft RS2 and the third rotational shaft RS3, a second clutch C2 is installed between the second rotational shaft RS2 and the fifth rotational shaft RS5, a third clutch C3 is installed between the sixth rotational shaft RS6 and the eighth rotational shaft RS8, and a fourth clutch C4 is installed between the seventh rotational shaft RS7 and the eighth rotational shaft RS8.

As described above, the multistage transmission composed of four simple planetary gear devices and six shift elements has ten forward gears and one reverse gear as shown in the operation mode table of FIG. 2. Therefore, according to the present disclosure, it is possible to realize a multistage transmission having at least ten forward stages and one reverse stage or more with a reduced number of parts and a reduced weight in comparison with conventional counterparts, thereby providing desired gear ratios in accordance with drive conditions of a vehicle and thus improving fuel efficiency of a vehicle.

Although an exemplary form of the present disclosure has been described for illustrative purposes, those skilled in the art will appreciate that various modifications, additions and substitutions are possible, without departing from the scope and spirit of the present disclosure.

What is claimed is:

1. A multistage transmission for a vehicle, the transmission comprising:
    an input shaft and an output shaft;
    a first planetary gear device, a second planetary gear device, a third planetary gear device, and a fourth planetary gear device, which are arranged to transfer rotary force between the input shaft and the output shaft, each of the first, second, third and fourth planetary gear devices including first, second and third rotary elements; and
    six shift elements connected to the rotary elements of the first to fourth planetary gear devices;
    wherein the second rotary element of the first planetary gear device is fixedly connected to the third rotary element of the second planetary gear device, and the third rotary element of the first planetary gear device is fixedly connected to the third rotary element of the third planetary gear device and to the first rotary element of the fourth planetary gear device, and
    wherein the first rotary element of the second planetary gear device is fixedly connected to the input shaft and is fixedly connected to the second rotary element of the fourth planetary gear device, and the first rotary element of the third planetary gear device is fixedly connected to the second rotary element of the fourth planetary gear device.

2. The multistage transmission according to claim 1, wherein the first rotary element of the first planetary gear device is selectively connected to a transmission case and selectively connected to the second rotary element of the second planetary gear device,
    the second rotary element of the first planetary gear device is selectively connected to the transmission case,
    the third rotary element of the first planetary gear device is selectively connected to the second rotary element of the second planetary gear device,
    the second rotary element of the third planetary gear device is selectively connected to the output shaft, and
    the third rotary element of the fourth planetary gear device is selectively connected to the output shaft.

3. The multistage transmission according to claim 2, wherein the first rotary element of the first planetary gear device is selectively connected to the transmission case via a first brake of the six shift elements, and the second rotary element of the first planetary gear device is selectively connected to the transmission case via a second brake of the six shift elements.

4. The multistage transmission according to claim 3, wherein the first rotary element of the first planetary gear device and the second rotary element of the second planetary gear device are selectively connected to each other via a first clutch of the six shift elements, the third rotary element of the first planetary gear device and the second rotary element of the second planetary gear device are selectively connected to each other via a second clutch of the six shift elements, the second rotary element of the third planetary gear device and the output shaft are selectively connected to each other via a third clutch of the six shift elements, and the third rotary element of the fourth planetary gear device and the output shaft are selectively connected to each other via a fourth clutch of the six shift elements.

5. A multistage transmission for a vehicle, the transmission comprising:

a first planetary gear device, a second planetary gear device, a third planetary gear device, and a fourth planetary gear device, each of which comprises first, second, and third rotary elements;

six shift elements configured to provide variable frictional force; and eight rotary shafts connected to the rotary elements of the first, second, third, and fourth planetary gear devices as the eight rotary shafts including first, second, third, fourth, fifth, sixth, seventh, and eighth rotational shafts, wherein the first rotational shaft is an input shaft fixedly connected to the first rotary element of the second planetary gear device, the first rotary element of the third planetary gear device, and the second rotary element of the fourth planetary gear device, the second rotational shaft is fixedly connected to the second rotary element of the second planetary gear device, the third rotational shaft is fixedly connected to the first rotary element of the first planetary gear device, the fourth rotational shaft is fixedly connected to the second rotary element of the first planetary gear device and the third rotary element of the second planetary gear device, the fifth rotational shaft is fixedly connected to the third rotary element of the first planetary gear device, the third rotary element of the third planetary gear device, and the first rotary element of the fourth planetary gear device, the sixth rotational shaft is fixedly connected to the second rotary element of the third planetary gear device, the seventh rotational shaft is fixedly connected to the third rotary element of the fourth planetary gear device, and the eighth rotational shaft is an output shaft.

6. The multistage transmission according to claim 5, wherein the six shift elements comprise:

a first brake installed between the third rotational shaft and a transmission case;

a second brake installed between the fourth rotational shaft and the transmission case;

a first clutch installed between the second rotational shaft and the third rotational shaft;

a second clutch installed between the second rotational shaft and the fifth rotational shaft;

a third clutch installed between the sixth rotational shaft and the eighth rotational shaft;

a fourth clutch installed between the seventh rotational shaft and the eighth rotational shaft.

* * * * *